(12) United States Patent
Goto et al.

(10) Patent No.: US 11,919,986 B2
(45) Date of Patent: Mar. 5, 2024

(54) FOULING PREVENTION ABILITY-IMPARTING AGENT AND WATER TREATMENT MEMBRANE MANUFACTURED USING SAME

(71) Applicants: NANYANG TECHNOLOGICAL UNIVERSITY, Singapore (SG); NIPPON SHOKUBAI CO., LTD., Osaka (JP)

(72) Inventors: Atsushi Goto, Singapore (SG); Rong Wang, Singapore (SG); Miao Tian, Singapore (SG); Yasuyuki Miyoshi, Singapore (SG); Hirotaka Mizoguchi, Osaka (JP)

(73) Assignees: Nanyang Technological University, Singapore (SG); Nippon Shokubai Co., Ltd., Osaka (JP)

( * ) Notice: Subject to any disclaimer, the term of this patent is extended or adjusted under 35 U.S.C. 154(b) by 416 days.

(21) Appl. No.: 17/435,289

(22) PCT Filed: Mar. 1, 2019

(86) PCT No.: PCT/JP2019/008069
§ 371 (c)(1),
(2) Date: Aug. 31, 2021

(87) PCT Pub. No.: WO2020/178892
PCT Pub. Date: Sep. 10, 2020

(65) Prior Publication Data
US 2022/0144988 A1 May 12, 2022

(51) Int. Cl.
*B01D 65/08* (2006.01)
*C02F 1/44* (2023.01)
(Continued)

(52) U.S. Cl.
CPC .......... *C08F 220/286* (2020.02); *B01D 65/08* (2013.01); *C02F 1/44* (2013.01);
(Continued)

(58) Field of Classification Search
CPC .. B01D 67/0013; B01D 71/80; B01D 61/145; B01D 71/76; B01D 65/08; B01D 69/02;
(Continued)

(56) References Cited

U.S. PATENT DOCUMENTS 11,071,954 B2 * 7/2021 Hikita .................... B01D 69/02
2010/0093919 A1   4/2010 Uesugi
(Continued)

FOREIGN PATENT DOCUMENTS

AU     2013365015     6/2015
CN     101595142      12/2009
(Continued)

*Primary Examiner* — Sharon Pregler
(74) *Attorney, Agent, or Firm* — Hamre, Schumann, Mueller & Larson, P.C.

(57) ABSTRACT

The present invention provides an antifouling ability-imparting agent that adheres well to a variety of water treatment membranes such as reverse osmosis membranes and imparts excellent antifouling ability to the water treatment membranes. The present invention relates to an antifouling ability-imparting agent containing a copolymer, the copolymer containing: a structural unit (I) represented by the following formula (1):

(Continued)

[Chem. 1]

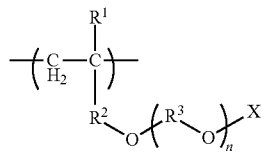

(1)

wherein $R^1$ is a hydrogen atom or a methyl group; $R^2$ is a direct bond, —$CH_2$—, —$CH_2CH_2$—, or —CO—; $R^3$s are the same as or different from each other and are each a C1-C20 alkylene group; X is —$CH_2CH(OH)CH_2(OH)$ or —$CH(—CH_2OH)_2$; and n is a number of moles of oxyalkylene groups added and is 0 to 100; and a structural unit (II) represented by the following formula (2):

[Chem. 2]

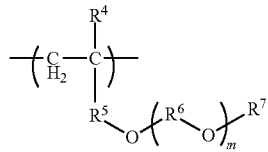

(2)

wherein $R^4$ is a hydrogen atom or a methyl group; $R^5$ is a direct bond, —$CH_2$—, —$CH_2CH_2$—, or —CO—; $R^6$s are the same as or different from each other and are each a C1-C20 alkylene group; $R^7$ is a hydrogen atom or a C1-C20 alkyl group; and m is a number of moles of oxyalkylene groups added and is 1 to 100.

3 Claims, 1 Drawing Sheet

(51) Int. Cl.
*C08F 220/28* (2006.01)
*C08J 7/04* (2020.01)
*C09D 133/14* (2006.01)
*B01D 67/00* (2006.01)

(52) U.S. Cl.
CPC ......... *C08F 220/282* (2020.02); *C08J 7/0427* (2020.01); *C09D 133/14* (2013.01); *B01D 67/0088* (2013.01); *C02F 2303/22* (2013.01); *C08F 2800/10* (2013.01)

(58) Field of Classification Search
CPC ...... B01D 69/06; B01D 61/18; B01D 69/141; B01D 67/0088; C08F 220/286; C08F 220/282
See application file for complete search history.

(56) References Cited

U.S. PATENT DOCUMENTS

| | | | |
|---|---|---|---|
| 2016/0288056 A1* | 10/2016 | Bergmann | B01D 67/0013 |
| 2020/0023322 A1* | 1/2020 | Hikita | C08F 2/28 |
| 2022/0144988 A1* | 5/2022 | Goto | C09D 133/14 |

FOREIGN PATENT DOCUMENTS

| | | |
|---|---|---|
| JP | 2012-057093 | 3/2012 |
| JP | 2014-008479 | 1/2014 |
| JP | 2014-121681 | 7/2014 |
| JP | 2015-229159 | 12/2015 |
| JP | 2017-000998 | 1/2017 |
| JP | 2017-169934 A | 9/2017 |
| JP | 2017-170395 | 9/2017 |
| JP | 2019-042689 | 3/2019 |
| WO | 2014/115631 | 7/2014 |

* cited by examiner

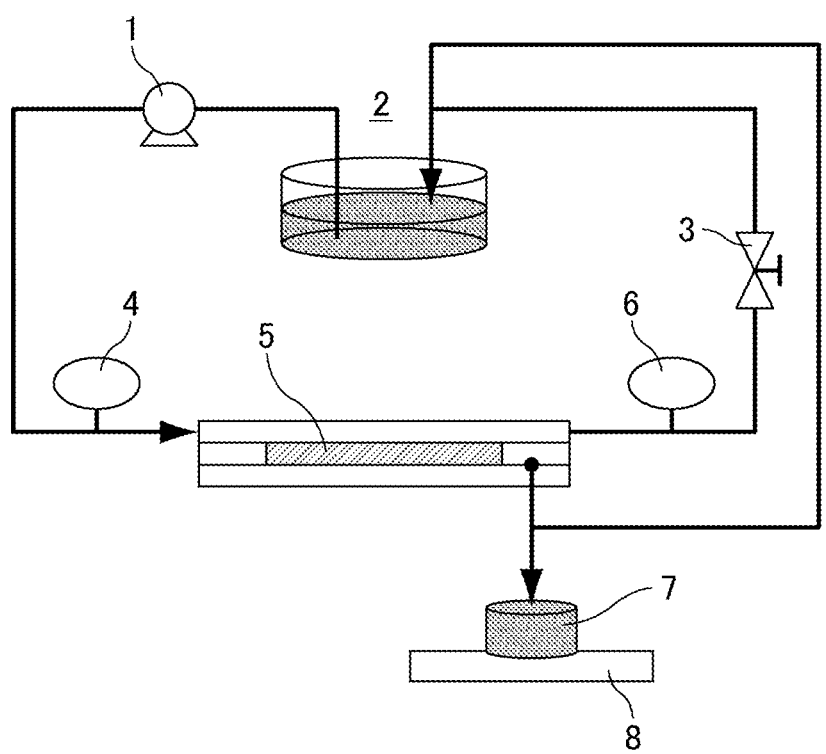

FOULING PREVENTION ABILITY-IMPARTING AGENT AND WATER TREATMENT MEMBRANE MANUFACTURED USING SAME

TECHNICAL FIELD

The present invention relates to antifouling ability-imparting agents and water treatment membranes prepared using the agents.

BACKGROUND ART

Water treatment membranes are used to treat water containing impurities, and their use has been expanding along with tightening of effluent and water quality standards around the world. Water treatment membranes have been used for applications such as water purification, process water production, sewage treatment, industrial wastewater treatment, and desalination of seawater and a variety of water treatment membranes such as microfiltration membranes, ultrafiltration membranes, nanofiltration membranes, reverse osmosis membranes, forward osmosis membranes, and ion exchange membranes have been used depending on the applications.

These water treatment membranes have a problem of suffering contamination (fouling) by contaminants (foulants) such as organic substances and microorganisms during use, which causes a decrease in the amount of permeable water (flux). In response to the problem, a technique for reducing fouling has been proposed in which a water treatment membrane is brought into contact with any of various hydrophilic resins for hydrophilization. For example, Patent Literature 1 discloses a surface treatment agent for a polyamide reverse osmosis membrane, the surface treatment agent containing water and a copolymer obtained through polymerization of a monomer composition containing a cationic (meth)acrylic acid ester and a monomer having a specific structure that contains a phosphorus atom and a nitrogen atom in its structure, and Patent Literature 2 discloses a method of hydrophilization of a reverse osmosis membrane by bringing a modified polyvinyl alcohol having a polyalkylene oxide chain into contact with the reverse osmosis membrane. Further, Patent Literature 3 discloses a method of anti-contamination processing a reverse osmosis membrane by bringing a betaine compound containing a polyalkylene oxide chain into contact with the reverse osmosis membrane, and Patent Literature 4 discloses a fouling inhibitor for a porous filtration membrane, the fouling inhibitor containing a copolymer that has a specific weight average molecular weight and contains a constituent unit (A) having a specific structure that contains an ethylene oxide chain in a side chain and a monomer unit (B) having a specific structure that contains a butyl group at an end of the side chain, the constituent unit (A) and the monomer unit (B) being present in a specific ratio.

CITATION LIST

Patent Literature

Patent Literature 1: JP 2014-8479 A
Patent Literature 2: JP 2014-121681 A
Patent Literature 3: JP 2015-229159 A
Patent Literature 4: JP 2017-998 A

SUMMARY OF INVENTION

Technical Problem

As described above, in order to reduce fouling, techniques of hydrophilization of water treatment membranes by bringing hydrophilic resins into contact with the water treatment membranes have been proposed. In response to this, a variety of hydrophilic resins have been proposed. Conventional hydrophilic resins however do not sufficiently adhere to reverse osmosis membranes (RO membranes), which are water treatment membranes, due to their hydrophobicity, for example. Thus, the hydrophilic resins peel off from RO membranes during long-term use, and the antifouling ability is lost. As described, conventional hydrophilic resins fail to sufficiently adhere to a wide variety of water treatment membranes and fail to impart excellent antifouling ability to the water treatment membranes.

The present invention has been made in view of such a current state of the art and aims to provide, for example, an antifouling ability-imparting agent that adheres well to a variety of water treatment membranes such as RO membranes and can impart excellent antifouling ability to the water treatment membranes.

Solution to Problem

The present inventors have examined antifouling ability-imparting agents that adhere well to a variety of water treatment membranes such as RO membranes and can impart excellent antifouling ability to the water treatment membranes. They found that a copolymer containing a structural unit (I) having a specific structure that contains an oxyalkylene group in a side chain and a hydroxy group-containing alkyl group at an end of the side chain and a structural unit (II) having a specific structure that contains an oxyalkylene group in a side chain and a hydrogen atom or an alkyl group as an end of the side chain adheres well to a variety of water treatment membranes and can impart excellent antifouling ability to the water treatment membranes. Thereby, the present invention has been completed.

That is, the present invention relates to an antifouling ability-imparting agent containing a copolymer, the copolymer containing:

a structural unit (I) represented by the following formula (1):

[Chem. 1]

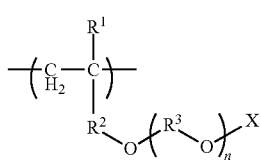

(1)

wherein $R^1$ is a hydrogen atom or a methyl group; $R^2$ is a direct bond, $-CH_2-$, $-CH_2CH_2-$, or $-CO-$; $R^3$s are the same as or different from each other and are each a C1-C20 alkylene group; X is $-CH_2CH(OH)CH_2(OH)$ or $-CH(-CH_2OH)_2$; and n is a number of moles of oxyalkylene groups added and is 0 to 100; and a structural unit (II) represented by the following formula (2):

[Chem. 2]

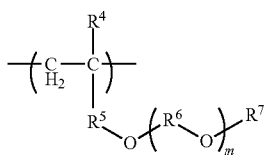
(2)

wherein $R^4$ is a hydrogen atom or a methyl group; $R^5$ is a direct bond, $-CH_2-$, $-CH_2CH_2-$, or $-CO-$; R s are the same as or different from each other and are each a C1-C20 alkylene group; $R^7$ is a hydrogen atom or a C1-C20 alkyl group; and m is a number of moles of oxyalkylene groups added and is 1 to 100.

Preferably, the copolymer has a weight average molecular weight of 1,000 to 1,000,000.

The present invention also relates to a water treatment membrane, which is treated with the antifouling ability-imparting agent of the present invention.

Advantageous Effects of Invention

The antifouling ability-imparting agent of the present invention adheres well to a variety of water treatment membranes such as microfiltration membranes, ultrafiltration membranes, nanofiltration membranes, reverse osmosis membranes, forward osmosis membranes, and ion exchange membranes and can impart excellent antifouling ability to the water treatment membranes. This achieves a high rate of flux recovery by cleaning even after deposition of foulants. Thus, use of the antifouling ability-imparting agent of the present invention allows a water treatment membrane to have excellent antifouling ability for a long time.

BRIEF DESCRIPTION OF DRAWINGS

FIG. 1 shows a schematic view of an apparatus used to evaluate the antifouling ability of water treatment membranes containing one of the polymers produced in examples and comparative examples and to measure the rates of flux recovery thereof.

DESCRIPTION OF EMBODIMENTS

The present invention is described in detail below.

Any combination of two or more of the following preferred embodiments of the present invention is also a preferred embodiment of the present invention.

1. Antifouling Ability-Imparting Agent

The antifouling ability-imparting agent of the present invention contains a copolymer that contains a structural unit (I) represented by the formula (1) and a structural unit (II) represented by the formula (2). The copolymer in the antifouling ability-imparting agent of the present invention may contain one or more structural units corresponding to the structural unit (I) and one or more structural units corresponding to the structural unit (II). The copolymer may further contain one or more different constituent units other than the structural units (I) and (II) as long as the copolymer contains the structural units (I) and (II).

In the formula (1), $R^1$ is a hydrogen atom or a methyl group.

$R^2$ is a direct bond, $-CH_2-$, $-CH_2CH_2-$, or $-CO-$. In terms of affinity to water treatment membranes, $-CO-$ is preferred.

$R^3$s are the same as or different from each other and are each a C1-C20 alkylene group. In terms of affinity to water treatment membranes, the carbon number of the alkylene group is preferably 1 to 10, more preferably 1 to 5, still more preferably 2 to 3.

The subscript n is the number of moles of oxyalkylene groups added and is 0 to 100. In terms of affinity to water treatment membranes, n is preferably 0 to 50, more preferably 0 to 20, still more preferably 0 to 5.

In the formula (2), $R^4$ is a hydrogen atom or a methyl group.

$R^5$ is a direct bond, $-CH_2-$, $-CH_2CH_2-$, or $-CO-$.

$R^6$s are the same as or different from each other and are each a C1-C20 alkylene group. In terms of affinity to water treatment membranes, the carbon number of the alkylene group is preferably 1 to 10, more preferably 1 to 5, still more preferably 2 to 3.

$R^7$ is a hydrogen atom or a C1-C20 alkylene group. In terms of affinity to water treatment membranes, $R^7$ is preferably a hydrogen atom or a C1-C15 alkylene group, more preferably a hydrogen atom or a C1-C10 alkylene group, still more preferably a hydrogen atom or a C1-C5 alkylene group.

The subscript m is the number of moles of oxyalkylene groups added and is 1 to 100. In terms of affinity to water treatment membranes, m is preferably 1 to 80, more preferably 1 to 60, still more preferably 3 to 55.

In the copolymer, the structural unit (I) represented by the formula (1) is preferably present in a proportion of 5 to 99 mol %, more preferably 10 to 99 mol %, still more preferably 20 to 99 mol % relative to 100 mol % of all structural units.

Also, in the copolymer, the structural unit (II) represented by the formula (2) is preferably present in a proportion of 1 to 95 mol %, more preferably 1 to 90 mol %, still more preferably 1 to 80 mol % relative to 100 mol % of all structural units.

A monomer forming the structural unit (I) and a monomer forming the structural unit (II) are preferably represented by the following formulas (3) and (4), respectively.

[Chem. 3]

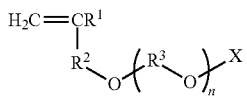
(3)

In the formula, all of $R^1$, $R^2$, $R^3$, X, and n are the same as those in the formula (1).

[Chem. 4]

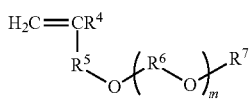
(4)

In the formula, all of $R^4$, $R^5$, $R^6$, $R^7$, and m are the same as those in the formula (2).

An example of the monomer represented by the formula (3) is glycerol mono(meth)acrylate.

Examples of the monomer represented by the formula (4) include alkoxy alkylene glycol (meth)acrylates such as ethoxy-diethylene glycol (meth)acrylate, methoxy-triethylene glycol (meth)acrylate, 2-ethylhexyl-diethylene glycol (meth)acrylate, methoxy-polyethylene glycol (meth)acrylate, methoxy-dipropylene glycol (meth)acrylate, phenoxy-diethylene glycol (meth)acrylate, and phenoxy-polyethylene glycol (meth)acrylate and (iso)propenyl group-containing alkoxy alkylene glycols such as an adduct of an alkylene oxide with a (meth)allyl alcohol and an adduct of an alkylene oxide with isoprenol. Preferred among these are methoxy-polyethylene glycol (meth)acrylate and an adduct of an alkylene oxide with isoprenol in terms of hydrophilicity.

When the copolymer contains a different constituent unit other than the structural units (I) and (II), the different constituent unit may be formed by a monomer such as an ethylenically unsaturated monomer containing a cationic group such as an amine, an ethylenically unsaturated monomer containing an anionic group such as a sulfonate group or a carboxylate group, or an ethylenically unsaturated monomer containing a different reactive group such as an epoxy group.

The different constituent unit is a constituent unit in which the carbon-carbon double bond (C=C) of the ethylenically unsaturated monomers is replaced by a carbon-carbon single bond (C—C) and formed bonding to adjacent constituent units. When the different constituent unit has a structure corresponding to this constituent unit, the different constituent unit does not have to actually have a structure in which the carbon-carbon double bond of the monomers is replaced by a carbon-carbon single bond.

In the copolymer, the different constituent unit other than the structural units (I) and (II) is preferably present in a proportion of 80 mol % or less, more preferably 60 mol % or less, still more preferably 40 mol % or less relative to 100 mol % of all structural units.

The copolymer preferably has a weight average molecular weight of 1,000 to 1,000,000. With a molecular weight within the above range, the adhesion to membranes and the antifouling ability can be both achieved. The weight average molecular weight is more preferably 5,000 to 500,000, still more preferably 10,000 to 200,000.

The weight average molecular weight of the copolymer may be measured with gel permeation chromatography (GPC) by the method described in the below-described examples.

The copolymer may be produced by any method as long as the copolymer is produced from a monomer represented by the formula (3), a monomer represented by the formula (4), and an optionally different monomer used. The polymerization reaction in the method may be any of radical polymerization, cationic polymerization, and anionic polymerization. The polymerization reaction may be either photopolymerization or thermal polymerization.

The polymerization reaction to produce the copolymer is preferably performed using a polymerization initiator, and the polymerization initiator may be selected from a radical polymerization initiator, a cationic polymerization initiator, and an anionic polymerization initiator depending on the type of the polymerization reaction. The polymerization initiator may be a commonly used one.

The polymerization initiator is preferably used in an amount of 0.001 to 1 mol per mol of all the monomers used in the polymerization reaction.

The antifouling ability-imparting agent of the present invention may optionally contain a different component as long as it contains the copolymer.

Examples of the different component include pH stabilizers such as phosphates, antimicrobial components such as sodium hypochlorite, and lower alcohols such as methanol, ethanol, and propanol. One or more of these may be used.

The antifouling ability-imparting agent of the present invention may contain any amount of the different component as long as the different component does not impair the antifouling ability. The amount of the different component is preferably 40% by mass or less, more preferably 20% by mass or less relative to 100% by mass of the copolymer in the antifouling ability-imparting agent.

The antifouling ability-imparting agent of the present invention may be used in the form of an aqueous solution. In this case, the concentration of the copolymer in the aqueous solution is preferably, but not limited to, 0.1 to 50,000 mg/L. The aqueous solution with a concentration within the above range has a viscosity that can achieve easy handling of the aqueous solution and can prevent a prolonged and insufficient treatment for imparting antifouling ability to water treatment membranes. Thereby, inefficiency is avoided. The concentration of the aqueous solution is more preferably 0.1 to 20,000 mg/L, still more preferably 0.1 to 10,000 mg/L.

The aqueous solution of the antifouling ability-imparting agent may be prepared using any water, and the water is preferably water with a low ion load such as demineralized water. The antifouling ability-imparting agent may be added to water to be treated with a water treatment membrane, whereby an aqueous solution may be prepared and the water treatment membrane may be treated with the aqueous solution.

2. Method of Imparting Antifouling Ability

Antifouling ability may be imparted to a water treatment membrane by any method using the antifouling ability-imparting agent of the present invention. Examples of the method include a method of forming a water treatment membrane using a mixture prepared by mixing a material of the membrane with the antifouling ability-imparting agent of the present invention before formation of the water treatment membrane, a method of binding the copolymer in the antifouling ability-imparting agent of the present invention to the surface of a resin material of a water treatment membrane by graft polymerization or the like, a method of coating the surface of a water treatment membrane with the antifouling ability-imparting agent of the present invention, and a method of bringing an aqueous solution of the antifouling ability-imparting agent of the present invention into contact with the surface of a water treatment membrane. Among the methods of treating a water treatment membrane with the antifouling ability-imparting agent, antifouling ability is preferably imparted to a water treatment membrane by a method of bringing an aqueous solution of the antifouling ability-imparting agent of the present invention into contact with a water treatment membrane. Use of the method can simultaneously achieve water treatment with a water treatment apparatus and impartment of antifouling ability to the water treatment membrane and can most simply impart antifouling ability to the water treatment membrane.

The method of bringing an aqueous solution of the antifouling ability-imparting agent of the present invention into contact with a water treatment membrane may be any method that allows a water treatment membrane to have antifouling ability. The method is preferably a method of passing the aqueous solution of the antifouling ability-imparting agent through a water treatment membrane under pressure.

When the aqueous solution of the antifouling ability-imparting agent is passed through a water treatment membrane under pressure, the aqueous solution of the antifouling ability-imparting agent may be passed through a water treatment membrane provided in a water treatment apparatus under pressure or the aqueous solution of the antifouling ability-imparting agent may be passed through a water treatment membrane separated from a water treatment apparatus. When antifouling ability is imparted to a water treatment membrane provided in a water treatment apparatus, the antifouling ability-imparting agent of the present invention is added to water to be treated during operation of the water treatment apparatus and water treatment and impartment of antifouling ability may be simultaneously performed, or alternatively, only impartment of antifouling ability may be performed without water treatment.

When the aqueous solution of the antifouling ability-imparting agent is passed through the water treatment membrane under pressure, the pressure is preferably 0.1 to 12 MPa as long as antifouling ability is imparted.

The flux of the membrane when the solution is passed therethrough is preferably, but not limited to, about 0.1 to 15 m³/m²/day.

When the solution is passed under the above-described conditions, too much decrease in flux is prevented and antifouling ability can be sufficiently imparted, simultaneously.

The treatment of passing the aqueous solution of the antifouling ability-imparting agent through the membrane under pressure may be performed for any duration. To prevent too much decrease in flux and sufficiently impart antifouling ability, simultaneously, the duration is preferably 1 to 1,000 hours, more preferably 2 to 300 hours.

The treatment of passing the aqueous solution of the antifouling ability-imparting agent through the membrane under pressure may be performed at any temperature. To prevent too much decrease in flux and prevent modification of the water treatment membrane, the temperature is preferably 5° C. to 60° C., more preferably 10° C. to 50° C.

3. Method of Reducing Fouling

The antifouling ability-imparting agent of the present invention can impart antifouling ability to water treatment membranes. However, even with the antifouling ability-imparting agent of the present invention, foulants gradually deposit on a water treatment membrane along with long-term use of the water treatment membrane for water treatment, leading to inevitable reduction in water permeability. The water permeability of the water treatment membrane can be recovered by removing the foulants deposited on the membrane.

The foulants deposited on the membrane may be removed by any method and can be effectively removed by cleaning by mechanical peeling and/or chemical cleaning, recovering the permeability of the water treatment membrane. The flux in the water treatment membrane treated with the antifouling ability-imparting agent of the present invention is highly recovered by any of such cleaning techniques. Thus, any combination of these cleaning techniques allows the membrane to have excellent antifouling ability for a long time.

The present invention also relates to a method of reducing fouling, including a step of removing foulants as described above to recover the permeability of a water treatment membrane. In other words, the present invention also relates to a method of reducing fouling of a water treatment membrane, the method including a step of imparting antifouling ability to a water treatment membrane by treating the water treatment membrane with an antifouling ability-imparting agent and a step of removing foulants deposited on the water treatment membrane by cleaning the water treatment membrane having antifouling ability through cleaning by mechanical peeling and/or chemical cleaning, the antifouling ability-imparting agent containing a copolymer that contains a structural unit (I) represented by the following formula (1):

[Chem. 5]

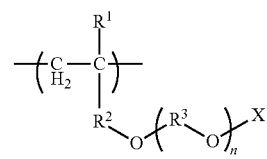

(1)

(wherein $R^1$ is a hydrogen atom or a methyl group; $R^2$ is a direct bond, —$CH_2$—, —$CH_2CH_2$—, or —CO—; $R^3$s are the same as or different from each other and are each a C1-C20 alkylene group; X is —$CH_2CH(OH)CH_2(OH)$ or —$CH(-CH_2OH)_2$; and n is the number of moles of oxyalkylene groups added and is 0 to 100); and a structural unit (II) represented by the following formula (2):

[Chem. 6]

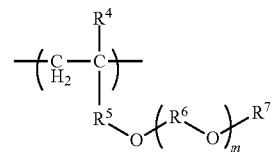

(2)

(wherein $R^4$ is a hydrogen atom or a methyl group; $R^3$ is a direct bond, —$CH_2$—, —$CH_2CH_2$—, or —CO—; $R^6$s are the same as or different from each other and are each a C1-C20 alkylene group; $R^7$ is a hydrogen atom or a C1-C20 alkyl group; and m is the number of moles of oxyalkylene groups added and is 1 to 100).

The step of removing foulants is performed by cleaning by mechanical peeling and/or chemical cleaning.

The chemical cleaning may be performed by any method that removes foulants deposited on a water treatment membrane with chemicals. The chemical cleaning is preferably performed using at least one cleaner selected from the group consisting of acids and/or salts thereof (hereinafter, referred to as acids (salts)) and alkalis.

The cleaning by mechanical peeling may be performed by any method that removes foulants deposited on a water treatment membrane by a mechanical peeling force. The cleaning by mechanical peeling can be performed by cleaning through ultrasoniation, bubbling, or the like or by backwashing.

The backwashing is a method to remove foulants deposited on a water treatment membrane by a mechanical peeling force generated by passing water through the water treatment membrane in the direction opposite to the flow of water in the water treatment.

In the case of backwashing, water may be passed through the water treatment membrane with any flux in the direction opposite to the flow of water in the water treatment. The flux is preferably 0.1 to 15 m³/m²/day in consideration of sufficient removal of foulants and efficient cleaning.

Water may be passed under pressure. The pressure when water is passed under pressure is preferably, but not limited to, 0.1 to 12 Mpa in consideration of sufficient removal of foulants and prevention of adverse effects on the membrane.

When the step of removing foulants is performed by cleaning using at least one cleaner selected from the group consisting of acids (salts) and alkalis, the following acids (salts) and alkalis may be used. Examples of the acids include inorganic acids such as hydrochloric acid, sulfuric acid, nitric acid, nitrous acid, carbonic acid, phosphoric acid, hypochlorous acid, and hypoiodous acid and organic acids such as formic acid, acetic acid, citric acid, propionic acid, butyric acid, oxalic acid, lactic acid, maleic acid, fumaric acid, succinic acid, and benzoic acid. One or more of these may be used. Examples of the salts of the acids include alkali metal salts such as a sodium salt and a potassium salt and organic salts such as an ammonium salt.

Examples of the alkalis include alkali metal hydroxides such as sodium hydroxide and potassium hydroxide, sodium dodecyl sulfate, and tetrasodium ethylenediaminetetraacetate. One or more of these may be used.

The acids (salts) and alkalis may be used at any concentration for the cleaning. To sufficiently remove foulants without adversely affecting the water treatment membrane, the concentration is preferably such that the percentage of the solute in water is 0.1 to 60% by mass.

When the step of cleaning the water treatment membrane is performed using at least one cleaner selected from the group consisting of acids (salts) and alkalis, cleaning of the water treatment membrane may be performed using a cleaner by any method that achieves cleaning of the water treatment membrane. The water treatment membrane may be cleaned as follows: a water treatment membrane detached from a water treatment apparatus may be immersed in a cleaner or a cleaner may be passed through the water treatment membrane, or alternatively, a cleaner may be passed through a water treatment membrane attached to a water treatment apparatus. In particular, to simply clean a water treatment membrane, a cleaner is preferably passed through a water treatment membrane attached to a water treatment apparatus.

4. Water Treatment Membrane and Water Treatment System

The antifouling ability-imparting agent of the present invention adheres well to a variety of water treatment membranes such as RO membranes and can impart excellent antifouling ability to the membranes, and the water treatment membranes treated with the antifouling ability-imparting agent of the present invention can have excellent antifouling ability for a long time. The present invention also relates to the water treatment membrane treated with the antifouling ability-imparting agent of the present invention. Specific examples of the water treatment membrane include microfiltration membranes, ultrafiltration membranes, nanofiltration membranes, RO membranes, forward osmosis membranes, and ion exchange membranes.

The water treatment membrane of the present invention can suitably be used in a variety of water treatment systems such as an ultrapure water producing system and a wastewater collection system.

EXAMPLES

The following description is offered to demonstrate the present invention based on examples of the present invention. The examples should not be construed as limiting the present invention. Unless otherwise mentioned, the term "part(s)" means "part(s) by weight" and "%" means "% by mass".

The weight average molecular weights of the polymers produced in Examples 1 to 6 and Comparative Examples 1 and 2 were determined under the following conditions.
Apparatus: HLC-8320GPC (Tosoh Corporation)
Detector: RI
Columns: Shodex Asahipak GF-310-HQ, GF-710-HQ, and GF-1G 7B (Showa Denko K.K.)
Column temperature: 40° C.
Flow rate: 0.5 ml/min
Calibration curve: POLYETHYLENE GLYCOL STANDARD (Sowa Kagaku Co., Ltd.)
Eluent: 0.1 M aqueous solution of sodium acetate/acetonitrile=75/25 wt %

1. Production of Polymers

Example 1

A 200-mL glass separable flask equipped with a thermometer, a reflux condenser, and a stirrer was charged with 50.7 parts of pure water, and the contents were heated to 80° C. under stirring. Subsequently, under stirring, to the polymerization reaction system were added dropwise 4.8 parts of glycerol monomethacrylate (hereinafter, referred to as GLMM), 57.9 parts of methoxy polyethylene glycol acrylate (Shin-Nakamura Chemical Co., Ltd., methoxy polyethylene glycol #400 acrylate, number of moles of ethylene glycol added: 9, hereinafter, referred to as AM-90G), 22.5 parts of a 2% by mass aqueous solution of sodium persulfate (hereinafter, referred to as 2% NaPS), 0.9 parts of a 35% by mass aqueous solution of sodium bisulfite (hereinafter, referred to as 35% SBS), and 20 parts of pure water from different drop nozzles. The drop times of the liquids were 180 minutes for GLMM, 180 minutes for AM-90G, 210 minutes for 2% NaPS, 180 minutes for 35% SBS, and 180 minutes for pure water. All the liquids were begun to be added dropwise at the same time and were each added dropwise at a constant rate continuously.

After the completion of the dropwise addition, the reaction solution was aged by maintaining the temperature of the reaction solution at 80° C. for additional 30 minutes to complete the polymerization. Thus, a copolymer (1) having a weight average molecular weight of 54,000 was obtained.

Example 2

A 50-mL vial was charged with 109.2 parts of pure water, 26.6 parts of GLMM, 2.9 parts of AM-90G, 0.09 parts of NaPS, and 0.064 parts of SBS. The contents were heated to 80° C. with an automatic synthesis apparatus, followed by stirring for three hours to complete the polymerization. Thus, a copolymer (2) having a weight average molecular weight of 120,000 was obtained.

Example 3

Polymerization was performed as in Example 1 except that the amount of initially charged pure water was changed to 34.8 parts, the amount of GLMM was changed to 19.2 parts, the amount of AM-90G was changed to 14.5 parts, the amount of 2% NaPS was changed to 22.5 parts, the amount of 35% SBS was changed to 1.3 parts, and the amount of pure water added dropwise was changed to 20 parts. Thus, a copolymer (3) having a weight average molecular weight of 19,000 was obtained.

Example 4

A 30-mL Schlenk tube was charged with 1.5 parts of GLMM, 0.014 parts of α-iodophenyl ethyl acetate, 0.003 parts of 2,2'-azobis(2,4-dimethylvaleronitrile), 0.043 parts of tetrabutylammonium iodide, and 2.25 parts of ethanol, and then, the inside of the Schlenk tube was purged with argon gas. The contents in the Schlenk tube were reacted by stirring at 60° C. for 25 minutes. After the completion of the reaction, the resulting reaction solution was added dropwise to diethyl ether to give a polymer in a first stage. The polymer had a number average molecular weight Mn of 8,000 and a weight average molecular weight of 10,000.

Subsequently, a 100-mL recovery flask was charged with 0.042 parts of the obtained polymer, 0.26 parts of AM-90G, 0.002 parts of 4,4'-azobis(4-cyanovaleric acid), 0.003 parts of sodium iodide, and 4.29 parts of ion exchange water, and then, the inside of the recovery flask was purged with argon gas. The contents in the recovery flask were reacted by stirring at 90° C. for three hours. After the completion of the reaction, the resulting reaction solution was diluted with methanol and the dilution was added dropwise to diethyl ether to give a block copolymer (4). The block copolymer (4) had a number average molecular weight Mn of 14,000 and a weight average molecular weight of 23,000.

In the block copolymer (4), the molar ratio of a glycerol monomethacrylate unit to a methoxypolyethylene glycol acrylate unit was 78:22, which was calculated from the number average molecular weights Mn of the polymer in the first stage and the block copolymer (4).

Example 5

Polymerization was performed as in Example 2 except that the amount of pure water was changed to 20.2 parts, GLMM was changed to glycerol monoacrylate (hereinafter, referred to as GLMA) in an amount of 4.38 parts, the amount of AM-90G was changed to 3.62 parts, the amount of NaPS was changed to 0.11 parts, and the amount of SBS was changed to 0.07 parts. Thus, a copolymer (5) having a weight average molecular weight of 51,000 was obtained.

Example 6

Polymerization was performed as in Example 5 except that the amount of pure water was changed to 15.0 parts, the amount of GLMA was changed to 5.85 parts, AM-90G was changed to a 60% aqueous solution of an adduct of 50 mol of EO with isoprenol (referred to as IPN-50) in an amount of 1.60 parts, the amount of NaPS was changed to 0.12 parts, and the amount of SBS was changed to 0.06 parts. Thus, a copolymer (6) having a weight average molecular weight of 48,000 was obtained.

Comparative Example 1

Polymerization was performed as in Example 1 except that no GLMM was used, the amount of initially charged pure water was changed to 48.5 parts, the amount of AM-90G was changed to 57.9 parts, the amount of 2% NaPS was changed to 18.0 parts, the amount of 35% SBS was changed to 0.3 parts, and the amount of pure water added dropwise was changed to 20 parts. Thus, a comparative polymer (1) having a weight average molecular weight of 43,000 was obtained.

Comparative Example 2

Polymerization was performed as in Example 1 except that no AM-90G was used, the amount of initially charged pure water was changed to 44.7 parts, the amount of GLMM was changed to 32.0 parts, and the amount of 2% NaPS was changed to 30.0 parts. Thus, a comparative polymer (2) having a weight average molecular weight 47,000 was obtained.

2. Characteristic Evaluation

Each of the polymers synthesized in Examples 1 to 6 and Comparative Examples 1 and 2 was used to modify a water treatment membrane by the below-described technique and the antifouling ability was evaluated. A water treatment membrane on which foulants were deposited was treated with an alkali, and the rate of flux recovery by the alkali treatment was measured. A water treatment membrane not modified with any of the polymers was also evaluated as in the above description as a reference, which was taken as Comparative Example 3. The results are shown in Table 1.

<Modification of Membrane>

A polyethersulfone hollow-fiber ultrafiltration membrane (UF membrane) module having a fraction molecular weight of 60,000 was immersed in an aqueous solution of each of the synthesized polymers for 24 hours so that the surface of the membrane was modified with the polymer.

<Evaluation of Antifouling Ability>

With an apparatus, shown in FIG. 1, including the membrane module modified with the synthesized polymer, ion exchange water was passed through the membrane module under a pressure of 1 bar, and then, a 0.5% by weight aqueous solution of bovine serum albumin as foulants was passed through the membrane module under a pressure of 1 bar. Then, a flux $PWP_F$ was measured.

<Measurement of Rate of Flux Recovery>

With an apparatus, shown in FIG. 1, including the membrane module modified with the synthesized polymer, ion exchange water was passed through the membrane module under a pressure of 1 bar, and a flux $PWP_{BF}$ was measured. Subsequently, a 0.5% by weight aqueous solution of bovine serum albumin as foulants was passed through the membrane module under a pressure of 1 bar for two hours so that the foulants were adsorbed on the surface of the membrane. After the foulants were adsorbed on the membrane, the membrane was cleaned by passing ion exchange water through the membrane module for 15 minutes, followed by a 0.2% by weight aqueous solution of sodium hydroxide for 15 minutes. After the cleaning of the membrane, ion exchange water was again passed through the membrane module under a pressure of 1 bar, and a flux $PWP_{AF}$ was measured. The rate of flux recovery was calculated using the following equation, and the polymers were compared to each other in terms of antifouling ability.

$$\text{Rate of flux recovery (\%)} = PWP_{AF}/PWP_{BF} \times 100$$

TABLE 1

| Example | Polymer | Composition of polymer (mol %) | | | | Mw | Antifouling properties PWP$_F$ | Rate of flux recovery |
|---|---|---|---|---|---|---|---|---|
| Example 1 | Copolymer (1) | GLMM | 20 | AM-90G | 80 | 54,000 | 125 LMH/bar | 90% |
| Example 2 | Copolymer (2) | GLMM | 80 | AM-90G | 20 | 120,000 | 120 LMH/bar | 81% |
| Example 3 | Copolymer (3) | GLMM | 80 | AM-90G | 20 | 19,000 | 90 LMH/bar | >99% |
| Example 4 | Copolymer (4) | GLMM | 78 | AM-90G | 22 | 23,000 | 70 LMH/bar | 90% |
| Example 5 | Copolymer (5) | GLMA | 80 | AM-90G | 20 | 51,000 | 100 LMH/bar | >99% |
| Example 6 | Copolymer (6) | GLMA | 99 | IPN-50 | 1 | 48,000 | 85 LMH/bar | >99% |
| Comparative Example 1 | Comparative polymer (1) | — | | AM-90G | 100 | 43,000 | 60 LMH/bar | 80% |
| Comparative Example 2 | Comparative polymer (2) | GLMM | 100 | — | | 47,000 | 50 LMH/bar | 80% |
| Comparative Example 3 | — | — | | — | | — | 50 LMH/bar | 62% |

The results shown in Table 1 demonstrate that the UF membrane modified with any of the copolymers in the present invention has a high flux for an aqueous solution containing foulants passed therethrough and a good rate of flux recovery. This reveals that the copolymers in the present invention can impart excellent antifouling ability to water treatment membranes.

3. Production of polymers

Example 7

A 200-mL glass separable flask equipped with a thermometer, a reflux condenser, and a stirrer was charged with 60 parts of pure water, and the contents were heated to 80° C. under stirring. Subsequently, under stirring, to the polymerization reaction system were added dropwise 12.8 parts of GLMM, 25.7 parts of AM-90G, 20 parts of 2% NaPS, 0.76 parts of 35% SBS, and 20 parts of pure water from different drop nozzles. The drop times of the liquids were 180 minutes for GLMM, 180 minutes for AM-90G, 210 minutes for 2% NaPS, 180 minutes for 35% SBS, and 180 minutes for pure water. All the liquids were begun to be added dropwise at the same time and were each added dropwise at a constant rate continuously.

After the completion of the dropwise addition, the reaction solution was aged by maintaining the temperature of the reaction solution at 80° C. for additional 30 minutes to complete the polymerization. Thus, a copolymer (7) having a weight average molecular weight of 47,200 was obtained.

Example 8

Polymerization was performed as in Example 7 except that the amount of 35% SBS was changed to 0.50 parts. Thus, a copolymer (8) having a weight average molecular weight of 54,200 was obtained.

Example 9

Polymerization was performed as in Example 3 except that the amount of 35% SBS was changed to 1.0 part. Thus, a copolymer (9) having a weight average molecular weight of 23,700 was obtained.

4. Characteristic Evaluation

<Testing for Adsorption on Polyimide Membrane>

A specimen (i.e., a specimen before immersion) of a polyimide membrane (Ube Industries, Ltd., UPILEX, 75 µm, 15 mm×50 mm) was immersed in a 4% aqueous solution (the temperature of the aqueous solution: 25° C.) of the copolymer (7) obtained in Example 7 for 60 minutes, followed by drying at 130° C. for 60 minutes. The thus resulting specimen was referred to as a "specimen after immersion". The difference in specimen weight between before and after immersion was determined to calculate the amount (%) of the copolymer (7) adsorbed on the polyimide membrane. The same testing was performed on the copolymer (8), the copolymer (9), and the comparative polymer (1). The results are shown in Table 2.

TABLE 2

| Example | Polymer | Composition of polymer (mol %) | | | | Mw | Adsorbed amount |
|---|---|---|---|---|---|---|---|
| Example 7 | Copolymer (7) | GLMM | 60 | AM-90G | 40 | 47,200 | 2.6% |
| Example 8 | Copolymer (8) | GLMM | 60 | AM-90G | 40 | 54,200 | 2.2% |
| Example 9 | Copolymer (9) | GLMM | 80 | AM-90G | 20 | 23,700 | 1.6% |
| Comparative Example 4 | Comparative polymer (1) | — | | AM-90G | 100 | 43,000 | 0.4% |

The results shown in Table 2 demonstrate that the copolymers in the present invention highly adhere to a polyimide membrane. This reveals that the copolymers in the present invention also adhere excellently to reverse osmosis membranes.

REFERENCE SIGNS LIST

1: pump
2: feed liquid
3: pressure regulator
4: pressure gauge
5: ultrafiltration membrane (UF membrane)
6: pressure gauge
7: liquid that has passed through membrane (pure water)
8: scale

The invention claimed is:

1. An antifouling ability-imparting agent comprising a copolymer, the copolymer comprising:

a structural unit (I) represented by the following formula (1):

[Chem. 1]

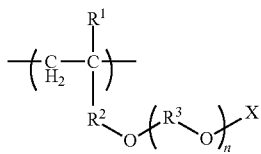

(1)

wherein $R^1$ is a hydrogen atom or a methyl group; $R^2$ is a direct bond, —$CH_2$—, —$CH_2CH_2$—, or —CO—; $R^3$s are the same as or different from each other and are each a C1-C20 alkylene group; X is —$CH_2CH(OH)CH_2(OH)$ or —$CH(—CH_2OH)_2$; and n is a number of moles of oxyalkylene groups added and is 0 to 100; and a structural unit (II) represented by the following formula (2):

[Chem. 2]

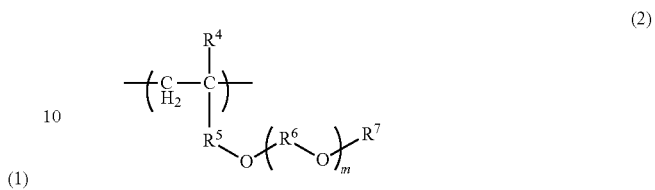

(2)

wherein $R^4$ is a hydrogen atom or a methyl group; $R^5$ is a direct bond, —$CH_2$—, —$CH_2CH_2$—, or —CO—; $R^6$s are the same as or different from each other and are each a C1-C20 alkylene group; $R^7$ is a hydrogen atom or a C1-C20 alkyl group; and m is a number of moles of oxyalkylene groups added and is 1 to 100.

2. The antifouling ability-imparting agent according to claim 1,
wherein the copolymer has a weight average molecular weight of 1,000 to 1,000,000.

3. A water treatment membrane, which is treated with the antifouling ability-imparting agent according to claim 1.

* * * * *